United States Patent [19]
Yocum, Jr. et al.

[11] Patent Number: 5,775,645
[45] Date of Patent: Jul. 7, 1998

[54] CONTROLLED-EMISSION SOLAR TABS FOR ATTITUDE SOLAR SAILING

[75] Inventors: John F. Yocum, Jr., Rancho Palos Verdes; Richard A. Fowell, Culver City; Raymond S. Lee, Cerritos, all of Calif.

[73] Assignee: Hughes Electronics Corporation, Los Angeles, Calif.

[21] Appl. No.: 610,920

[22] Filed: Mar. 5, 1996

[51] Int. Cl.$^6$ ................................................ B64G 1/24
[52] U.S. Cl. ........................................................ 244/168
[58] Field of Search ............................ 244/158 R, 168, 244/173; 136/292

[56] References Cited

U.S. PATENT DOCUMENTS

| | | | |
|---|---|---|---|
| 3,116,035 | 12/1963 | Cutler | 244/168 |
| 4,433,201 | 2/1984 | Fellas | 244/173 |
| 5,305,971 | 4/1994 | Decanini | 244/168 |

FOREIGN PATENT DOCUMENTS

| | | | |
|---|---|---|---|
| 01186498 | 7/1989 | Japan | 244/168 |
| 04143198 | 5/1992 | Japan | 244/168 |

OTHER PUBLICATIONS

Forward, R.L., "Grey Solar Sails", *The Journal of the Astronautical Sciences*, vol. 38, No. 2, Apr.–Jun. 1990, pp. 161–185.

"Spacecraft Radiation Torques", *NASA Space Vehicle Design Criteria (Guidance and Control)*, NASA SP–8027, Oct., 1969, pp. 1–25.

Kyroudis, George A., "Survey of Solar-Sailing Configurations for Satellite Attitude Control", AAS 91-486, pp. 815–833.

*Primary Examiner*—Galen L. Barefoot
*Attorney, Agent, or Firm*—Georgann S. Grunebach; Terje Gudmestad; Michael W. Sales

[57] ABSTRACT

Solar tabs are provided which have thermal emissivity and absorptivity properties designed to increase the attitude-control torques that can be generated with rotatable wings in a spacecraft. These increased torques enhance the ability to offset attitude-disturbance torques which typically tend to alter the attitude of a spacecraft from a desired attitude. The tabs include highly absorptive and nonemissive front faces, highly emissive back faces and a high thermal conductivity between the front faces and the back faces.

28 Claims, 7 Drawing Sheets

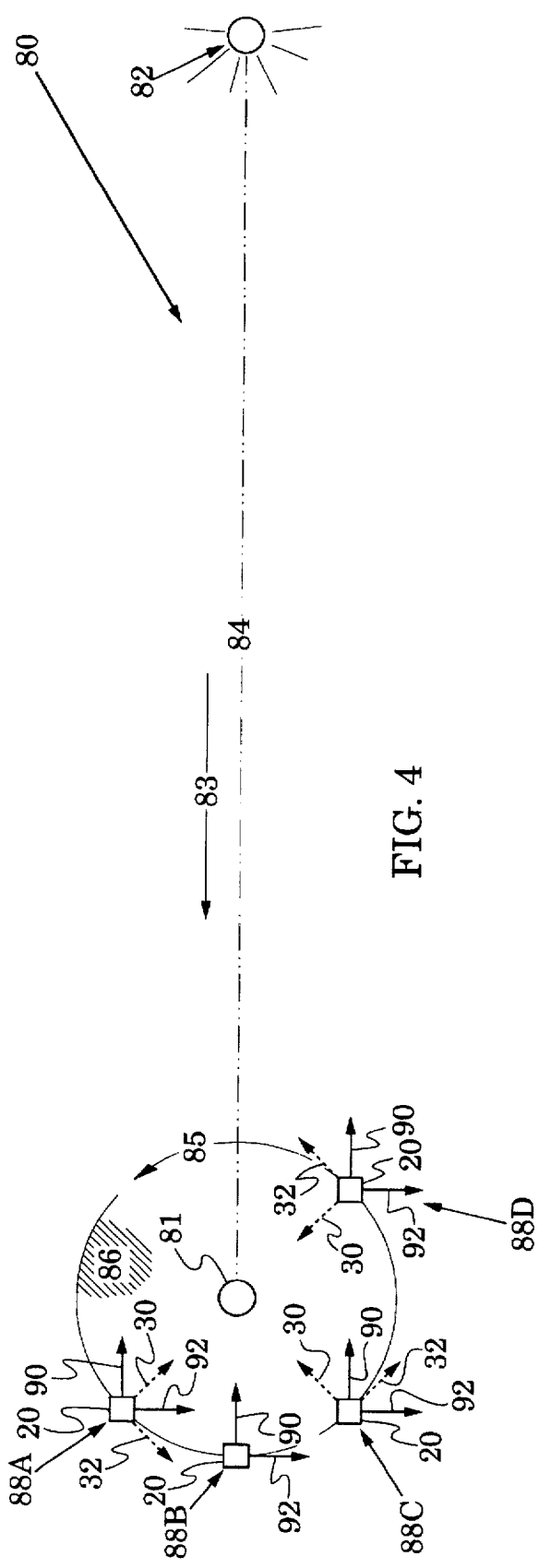
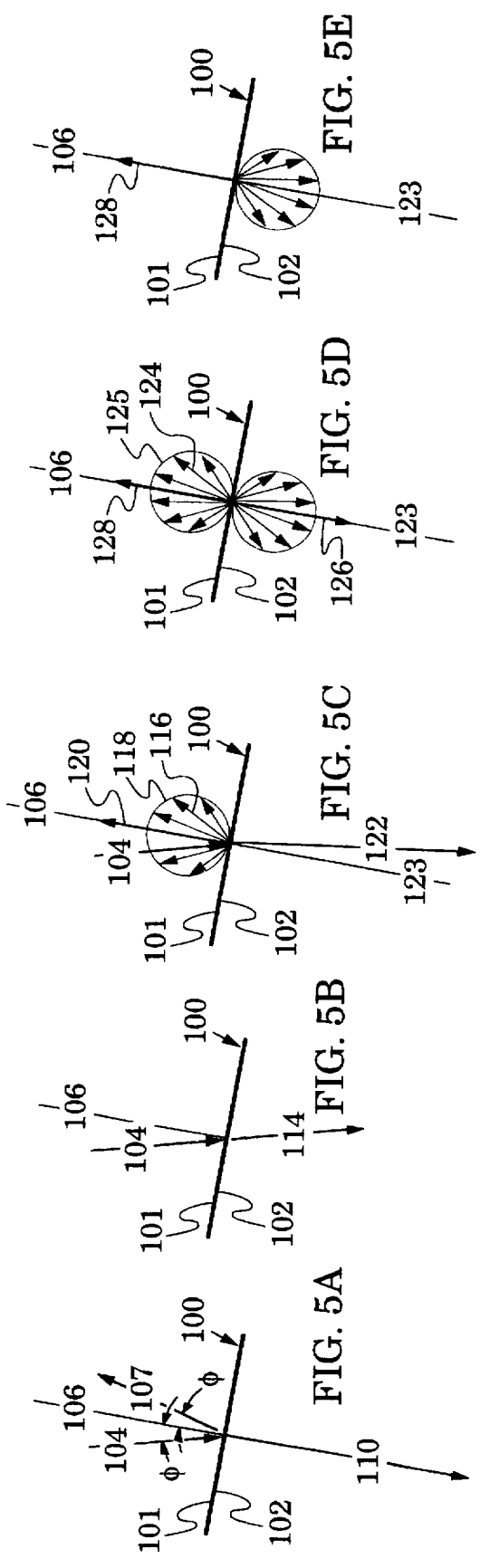
FIG. 4
FIG. 5A
FIG. 5B
FIG. 5C
FIG. 5D
FIG. 5E

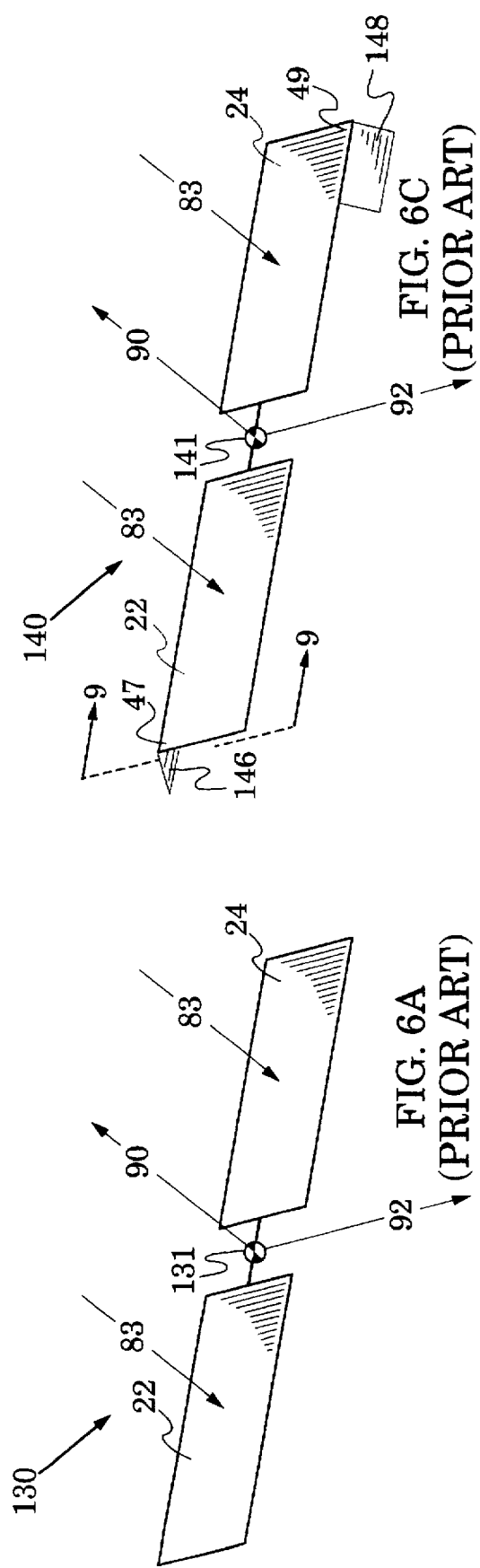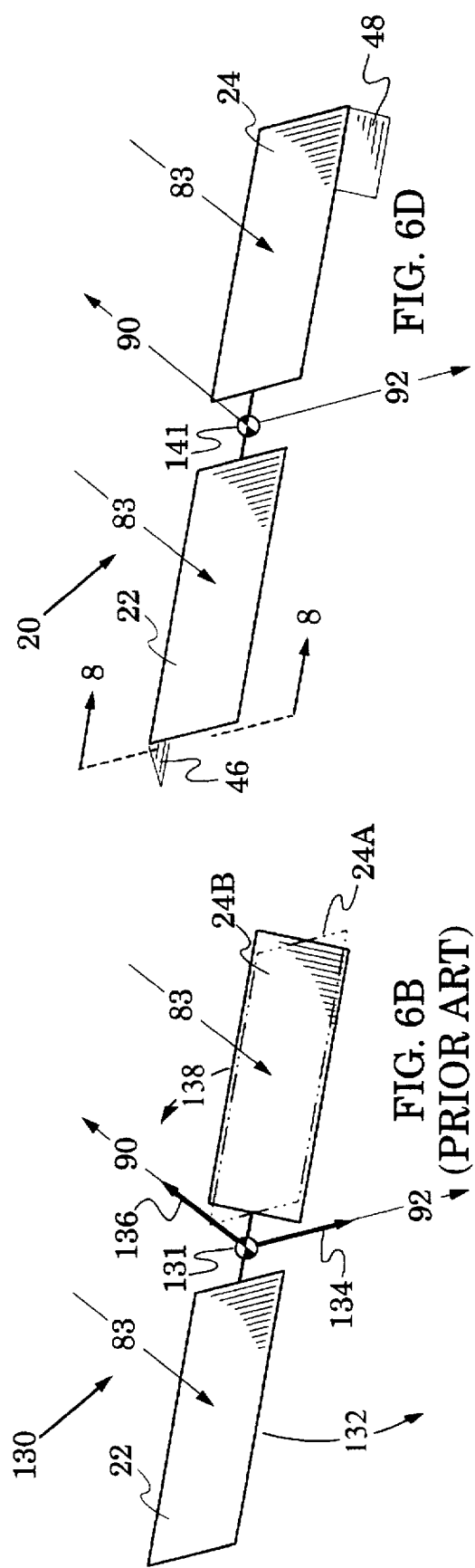

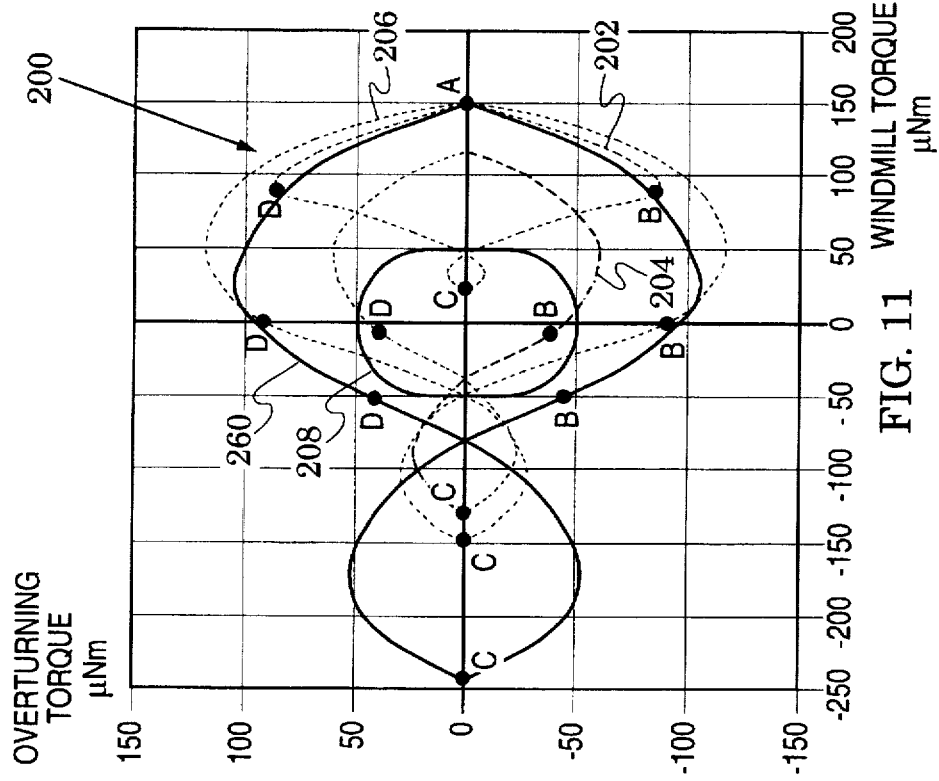
FIG. 11
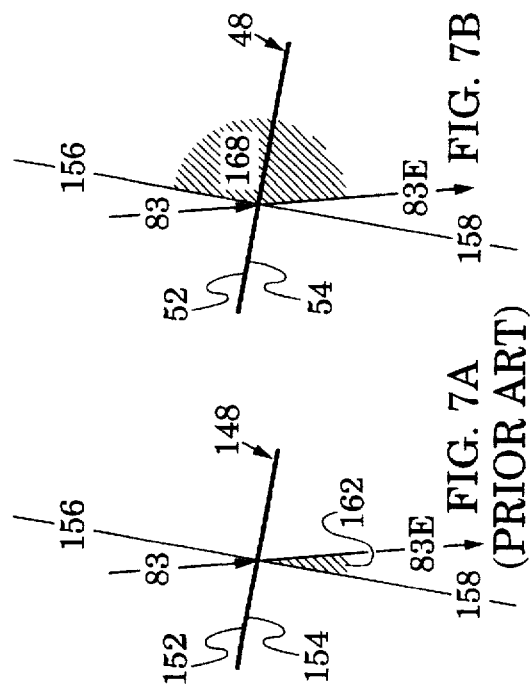
FIG. 7A (PRIOR ART)
FIG. 7B
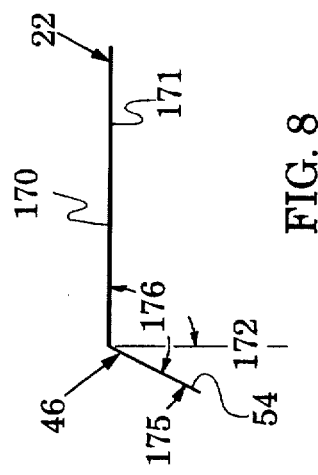
FIG. 8

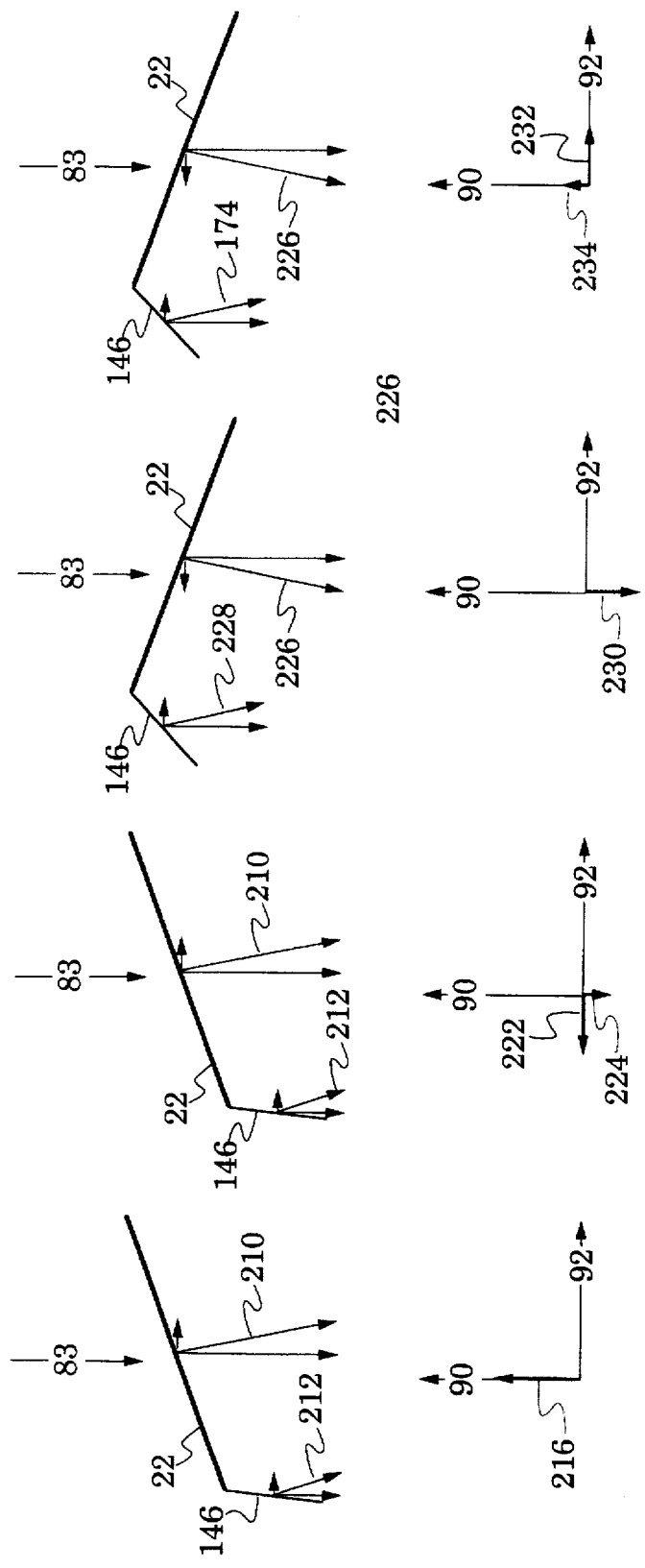
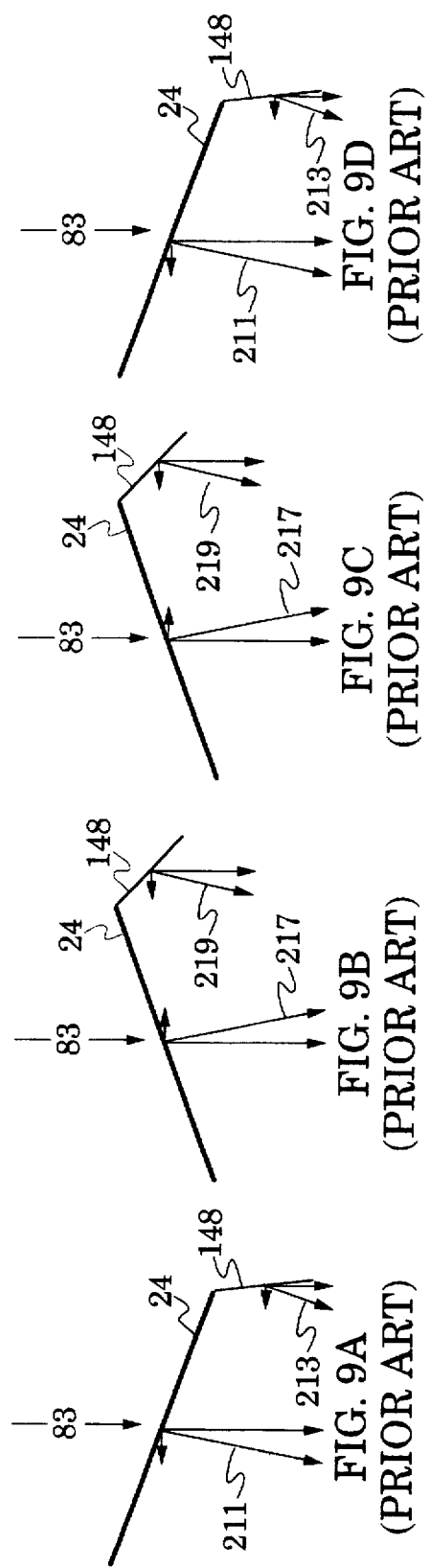
FIG. 9A (PRIOR ART)
FIG. 9B (PRIOR ART)
FIG. 9C (PRIOR ART)
FIG. 9D (PRIOR ART)

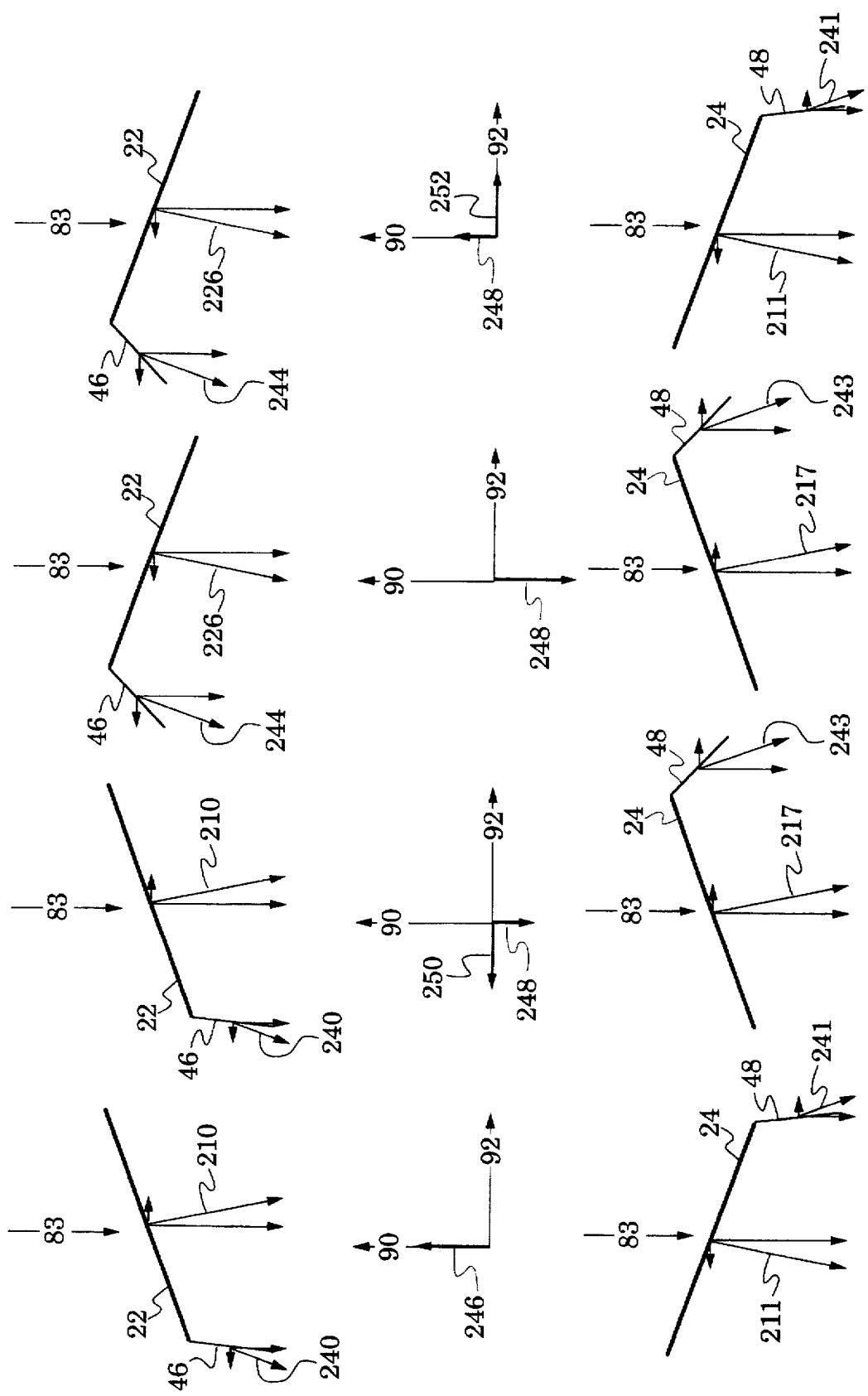

CONTROLLED-EMISSION SOLAR TABS FOR ATTITUDE SOLAR SAILING

GOVERNMENT RIGHTS

This invention was made with Government support under Contract No. N0039-88-C-0300 awarded by the Department of the Navy. The Government has certain rights in this invention.

BACKGROUND OF THE INVENTION

1. Field of the Invention

The present invention relates generally to spacecraft and more particularly to attitude solar sailing.

1. Description of the Related Art

Spacecraft are constantly immersed in a solar radiation which streams radially outward from the Sun. The solar light flux constant $S_o$ is the magnitude of the solar flux per unit area at the earth's distance $D_o$ from the sun of one astronomical unit ($\sim 1.50 \times 10^{11}$ meters). It is approximately 1.35 kW/m$^2$. A spacecraft at a distance D from the Sun receives a solar light flux of $S = S_o(D_o/D)^2$.

The power P of the solar light flux which intercepts a surface with an interception area $A_i$ is $P=SA_i$. The power of the solar flux is distributed across a complex thermal spectrum of the Sun at an effective temperature of ~5770° K. The light flux comes in the form of photons that have an energy E=hf in which f is the photon frequency and h is the Plank constant (h~6.63×10$^{-34}$ Joules/second). The effect of this power spectrum upon exposed surfaces of a spacecraft can be calculated by breaking the light spectrum into frequency bands which are small enough that the photons in each band can be considered to have a single frequency. The energy of n photons with a frequency f is E=nhf and their momentum is p=E/c=(nhf)/c, in which c is the speed of light.

If this frequency band of photons strikes a surface such as a solar wing, the photons interact with the atoms of the surface and are stopped in their flight. Whether the surface of the solar wing is reflecting, absorbing or transparent, the momentum and energy that were in the photons is transferred to the solar wing. The momentum impulses applied to the solar wing by the stopping of photons of a frequency f produces an incremental "radiation pressure force." The total incident radiation pressure force F on the solar wing is the sum of the incremental radiation pressure forces over all spectral frequencies. The magnitude of this force vector is F=P/c and its direction is that of the incident light.

A radiation pressure force is also generated when photons leave a solar wing, whether it be by reflection, transmission or emission. The direction of this force vector is opposite that of the photon travel. In summary, the direction of a radiation pressure force is the same direction of photon travel when photons enter a solar wing and it is in the opposite direction of photon travel when photons leave a solar wing.

In contrast to reflection, absorption and emission, transmission of a photon through a transparent surface generates little or no force. This is because an incident photon causes another photon to be emitted from an opposite face of the surface. Although the surface's refractive index causes the emitted photon's velocity to differ slightly from that of the incident photon, the induced force of the emitted photon substantially cancels the induced force of the incident photon.

A spacecraft in flight is subjected to small but significant long-term "attitude-disturbance torques" which can alter its attitude from a desired attitude. Although these attitude-disturbance torques have a variety of sources, e.g., gravity gradients and interactions with the earth's magnetic field, the principal source of attitude-disturbance torques (for orbital altitudes >1000 km) is the radiation pressure force of the solar radiation on exposed portions of the spacecraft.

In order to maintain a desired spacecraft attitude, the attitude-disturbance torques must be opposed by attitude-control torques which are typically imposed upon the spacecraft with momentum wheels, thrusters and "attitude solar sailing." Accelerating a spacecraft's momentum wheel induces an opposite control torque on the spacecraft and this control torque can cancel an attitude-disturbance torque. Opposing a long-term, attitude-disturbance torque with a momentum wheel will ultimately cause the velocity of the wheel to reach its design limit. The momentum wheel's velocity can be reduced (i.e., its momentum "dumped") with opposing torques which are generated by thrusters and/or attitude solar sailing. However, because spacecraft have a limited propellant capacity, the use of thrusters is preferably reserved for high-rate attitude control, e.g., during launch or during orbit changes.

In attitude solar sailing, a spacecraft's solar wings are oriented so as to generate attitude-control torques from the ever-present solar radiation. With this concept, a solar wing is rotated to a selected position which generates a constant control torque (in contrast, "solar tacking" is an associated concept in which attitude-control torques are generated by periodic rotation of the solar wings; solar tacking generates, on average, a desired torque vector but does not generate it at any one instant).

In order to improve the ability of attitude solar sailing to generate attitude-control torques about all of a spacecraft's body axes (pitch, roll and yaw), solar wings have been augmented with fixed-angle tabs. Although these tabs have improved the performance of attitude solar sailing, it has been shown (see Kyroudis, George A., "Survey of Solar-Sailing Configurations for Satellite Attitude Control", AAS 91-486) that they exhibit poor torquing capability along some of the spacecraft's body axes. To enhance this capability, investigators have typically concentrated on the selection of the tab's reflective properties (e.g., a selected mix of specular and diffuse reflection). In contrast, thermal emission has generally been recognized as a source of attitude-disturbance torques but ignored as a tool in the generation of attitude-control torques.

SUMMARY OF THE INVENTION

The present invention is directed to enhanced generation of attitude-control torques for improved attitude solar sailing. This goal is achieved with the recognition that controlled emissions from solar tabs can increase the torques generated along a windmill axis which is directed at the solar radiation and an overturning axis which is normal to the solar radiation. This increase facilitates the generation of larger torques for a selected wing and tab design or, alternatively, the generation of selected torques with smaller tabs and/or lesser tab offset from a spacecraft body.

In accordance with the invention, solar tabs are configured to absorb photons from the solar radiation in a front face, conduct the generated heat to a back face and emit photons from the back face. The tabs are also configured to reduce photon emission from the front face. The emitted photons from the back face generate a radiation pressure force which has force components that are normal to the solar radiation and reversed from those generated by conventional tabs.

One tab embodiment has a front face with a radiant-energy absorptivity greater than 0.75 and a thermal emissivity less than 0.25 and a back face with a thermal emissivity greater than 0.75. In a specific implementation, the tab is a polyester film with a coating of black nickel on its front face and a black or white coating on its rear face.

A spacecraft embodiment has the tabs attached to first and second solar wings and oppositely spaced from a rotation axis of the wings. The back face of each of the tabs preferably forms an angle between 100 and 135 degrees with the back face of that tab's respective wing.

The novel features of the invention are set forth with particularity in the appended claims. The invention will be best understood from the following description when read in conjunction with the accompanying drawings.

BRIEF DESCRIPTION OF THE DRAWINGS

FIG. 4 shows an exemplary, spatial relationship between the spacecraft of FIG. 1 and the earth and the sun;

FIGS. 5A–5C illustrate radiation pressure forces on a panel which result when incident light is respectively specularly reflected, absorbed and diffusively reflected from the panel;

FIG. 5D illustrates radiation pressure forces on a panel which has equal thermal emissivities on front and back faces of the panel;

FIG. 5E illustrates radiation pressure forces on a panel which has zero and nonzero thermal emissivities respectively on front and back faces of the panel;

FIG. 6A is a simplified, perspective view of a conventional spacecraft with solar wings that are exposed to the radiation pressure force of the solar radiation;

FIG. 6B is a view similar to FIG. 6A with the solar wings in a nonplanar arrangement;

FIG. 6C is a simplified, perspective view of a spacecraft which is formed by adding conventional solar tabs to the spacecraft of FIG. 6A;

FIG. 6D is a simplified, perspective view of the spacecraft of FIG. 1;

FIG. 7A is a side view of a conventional solar tab showing a composite, radiation pressure force region;

FIG. 7B is a side view of a solar tab in the spacecraft of FIG. 1 showing a composite, radiation pressure force region;

FIG. 8 is a view along the plane 8—8 of a solar wing and tab in FIG. 6D;

FIGS. 9A–9D illustrate radiation pressure forces and attitude-control torques for different wing positions in the conventional spacecraft of FIG. 6C from the perspective of plane 9—9 in FIG. 6C;

FIGS. 10A–10D illustrate radiation pressure forces and attitude-control torques for different wing positions in the spacecraft of FIGS. 1 and 6D from the perspective of plane 8—8 in FIG. 6D; and FIG. 11 is a graph of attitude-control torques which include those shown in FIGS. 9A–9D and FIGS. 10A–10D.

DESCRIPTION OF THE PREFERRED EMBODIMENTS

Figure 1:
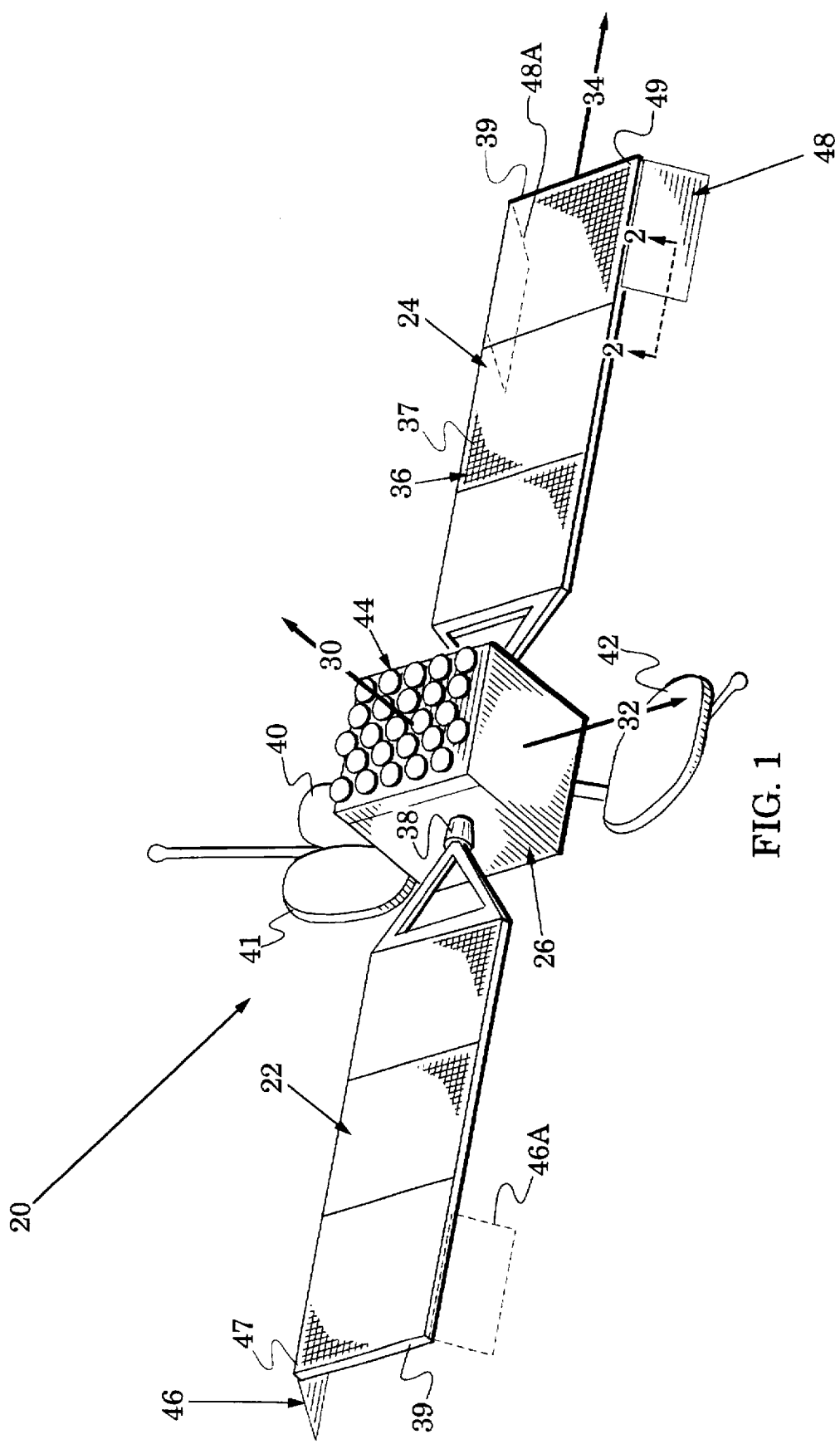
FIG. 1 is a perspective view of a spacecraft with solar wings in which the wings include solar sailing tabs in accordance with the present invention.

FIG. 1 illustrates a spacecraft 20 which has a pair of solar wings 22 and 24 and a body 26. The attitude of the spacecraft 20 is spatially specified with reference to a body frame of orthogonal axes. These body axes are a yaw axis 30, a roll axis 32 and a pitch axis 34. The solar wings 22 and 24 each carry arrays 36 of solar cells 37 which convert solar power to electrical energy for operation of the systems of the spacecraft 20.

Each solar wing has an inboard end 38 and an outboard end 39. The inboard end 38 of each wing is gimbaled within the body 26 to permit rotation of the wings 22 and 24 about the pitch axis 34 (the structure which permits this motion is typically referred to as the "pitch gimbal"). This rotation allows the solar cells 30 to be positioned so that they are optimally exposed to the radiation of the sun (not shown in this figure). Also attached to the body 26 are various communications antennas, e.g., dish antennas 40, 41 and 42 and an array antenna 44.

Figure 2:
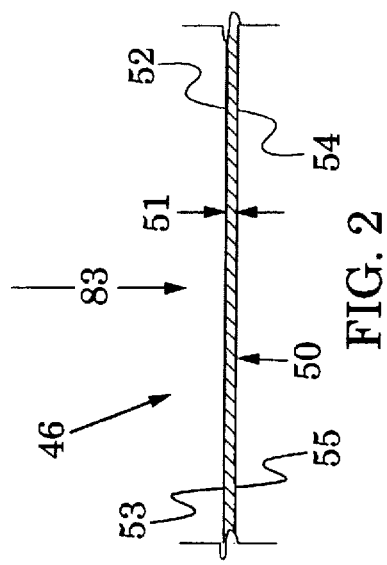
FIG. 2 is a greatly enlarged view along the plane 2—2 of a tab in FIG. 1.

To enhance the ability of the spacecraft 20 to develop attitude-control torques which aid in maintaining a desired attitude, a pair of solar tabs 46 and 48 are mounted to opposite outboard corners 47 and 49 of the solar wings 22 and 24 respectively. A cross section of the tab 46 is shown in FIG. 2. The cross section illustrates that the tab includes a sheet 50 with a front face 52 and a rear face 54. To reduce the weight of the tab 48, the thickness of the sheet 50 is preferably only as thick as is required to maintain its shape. If necessary, it may be supported with conventional structures, e.g., a wire frame.

Figure 3:
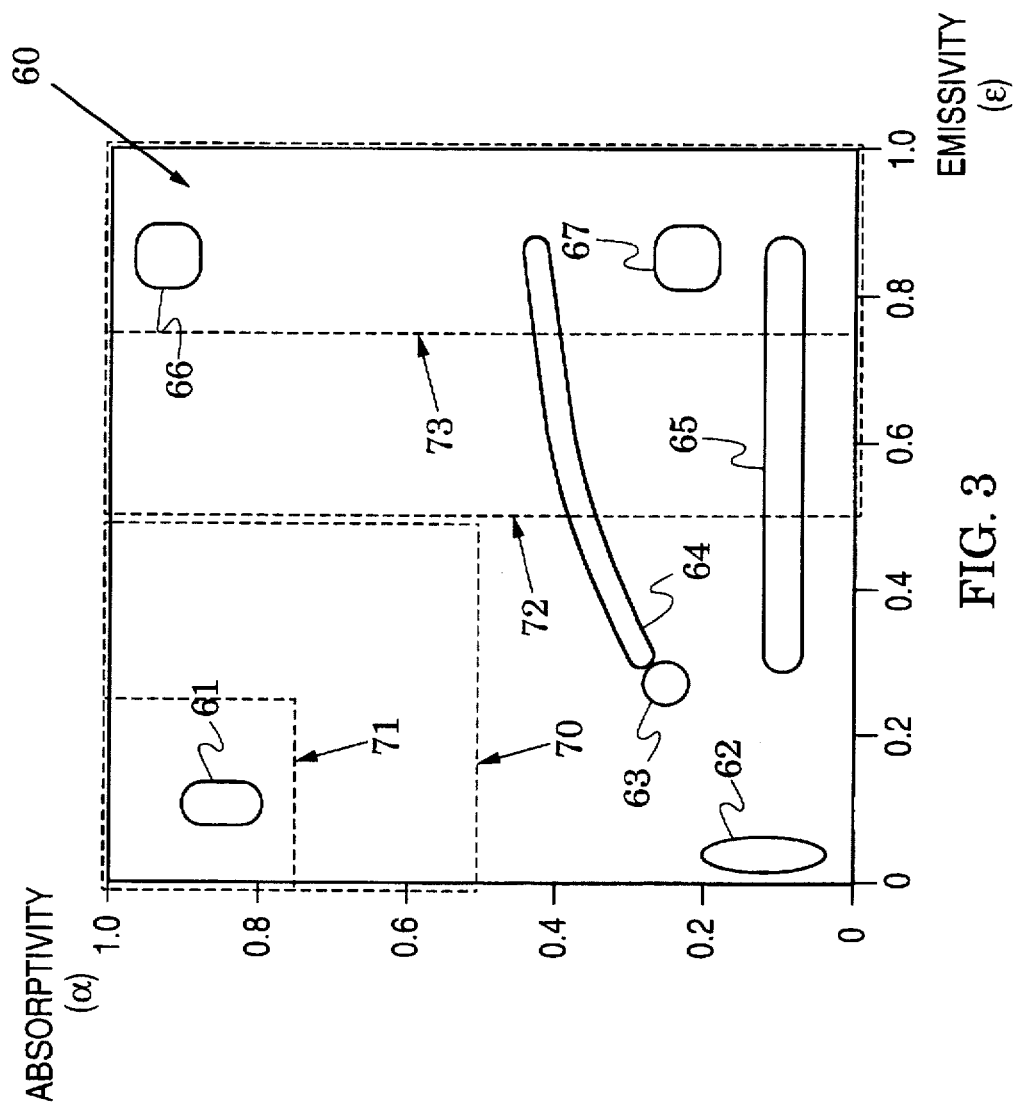
FIG. 3 is a graph which indicates the preferred absorptivity and emissivity of tab faces in FIG. 2.

The front face 52 has a high radiation absorptivity and a low thermal emissivity and the rear face 54 has a high thermal emissivity. In particular, the preferred radiation characteristics of the front face 50 and rear face 52 are quantified in the graph 60 of FIG. 3, which plots radiation absorptivity $\alpha$ (the ratio of radiation energy absorbed to incident radiation energy) against radiation emissivity $\epsilon$ (the ratio of power per unit area radiated by a surface to power per unit area radiated by a black body). The absorptivity and emissivity of several exemplary coatings are indicated by enclosed regions on the graph 60. These regions and their respective coatings are the following: 61— black nickel, black chromium or black copper, 62—polished metal, 63—aluminum paint, 64—aluminized Kapton (a polyimide sold under the trademark Kapton by E.I. du Pont de Nemours & Company), 65—silverized FEP Teflon (a polyfluoroethylenepropylene sold under the trademark FEP Teflon by E.I. du Pont de Nemours & Company), 66—black paint and 67—white paint.

The front face 52 of FIG. 2 preferably has an absorptivity >0.5 and an emissivity <0.5, i.e., the upper-left quadrant of the graph 60 which is indicated as the broken-line portion 70. The rear face 54 of FIG. 2 preferably has an emissivity >0.5, i.e., the right half of the graph 60 which is indicated as the broken-line portion 72 (for clarity of illustration, the portions 70 and 72 are slightly spaced from each other along a vertical centerline of the graph 60 but, in reality, the right edge of portion 70 coincides with the left edge of the portion 72). The ability of the tabs 46 and 48 to develop control torques is further enhanced if the front face 52 has an absorptivity >0.75 and an emissivity <0.75, i.e., the broken-line portion 71 of the graph 60, and if the rear face 54 has an emissivity >0.75, i.e., the broken-line portion 73 of the graph 60.

In operation of the tab 46 (and the tab 48), photons are conducted through the tab from its front face 52 to its back face 54 where they are emitted. The thermal conductivity of the sheet 50 is not of great consequence as long as it is not zero. A larger thermal conductivity will increase the differential temperature between the faces 52 and 54 but photons will still be conducted to the back face 54 and emitted. Therefore, in practice the material of the sheet 50 can basically be selected from a list of space-approved materials (materials which have desirable spacecraft properties, e.g., materials which inhibit outgassing and electrostatic discharge) for other parameters such as lightness and durability.

Exemplary tabs are sheets 50 of metals (e.g., aluminum) or plastics (e.g., polyimide or polyester films) with a thickness 51 which is preferably less than ~70 microns and with a front face 52 having a coating 53 of black nickel, black chromium or black copper and a rear face 54 having a white or black coating 55 (e.g., paint). Polyimide and polyester films are obtainable under the common names of Kapton and Mylar (a polyester sold under the trademark Mylar by E.I. du Pont de Nemours & Company).

An operational description of the generation of attitude-control torques in the spacecraft 20 of FIGS. 1 and 2 will be facilitated by preceding it with the following description of basic solar sailing concepts and relationships. In particular, these include: (a) the relationship of a coordinate body frame and a coordinate space frame (see FIG. 4), (b) force vectors generated by reflection, absorption and emission (see FIGS. 5A–5E), (c) the relationship between solar wings and tabs and a coordinate space frame (see FIGS. 6A–6D), (d) altered radiation pressure force due to controlled thermal emission (see FIGS. 7A–7B), (e) spatial relationship of a solar wing and a solar tab (see FIG. 8), (f) radiation pressure forces and attitude-control torques of conventional solar wings and tabs (see FIGS. 9A–9C).

FIG. 4 illustrates an exemplary spatial relationship 80 between the spacecraft 20, the earth 81 and the sun 82. In this figure, the earth 81 is observed from a point above its north pole. The solar radiation 83 streams along a sunline 84 which connects the sun 82 and the earth 81. The spacecraft 20 moves along an orbital path 85 which defines an orbital plane 86 (indicated by partial hatching) about the earth 81.

The spacecraft 20 is shown at exemplary positions 88A, 88B, 88C and 88D in its orbital path 85. The spacecraft 20 occupies these positions successively at 9PM, midnight, 8 AM and 9AM, in which all times are specified in local satellite time (LST). The spacecraft 20 is schematically indicated by a square with the yaw axis 30 and the roll axis 32 of FIG. 1 indicated by broken-line arrows. The attitude of the spacecraft 20 is controlled to position the yaw axis 30 and the roll axis 32 in the orbital plane 86. The yaw axis 30 is directed radially towards the earth 81 and the roll axis 32 is tangent with the orbital path 85. The pitch axis 34 of FIG. 1 is normal to the orbital plane 86; the pitch axis is not shown because it is directed away from an observer of the figure.

A description of the relationship between the solar wings (22 and 24 in FIG. 1) of the spacecraft 20 and the solar radiation 83 is facilitated by reference to a space frame of orthogonal axes which is fixed relative to the earth 81 and the sun 82. This space frame includes a windmill axis 90 which is the projection into the orbit plane of a line from the spacecraft to the sun 82 (i.e., it is substantially parallel with the sunline 84) and an overturning axis 92 which lies in the orbital plane 86. A third orthogonal axis of this space frame is normal to the orbital plane 86 and is not shown. The yaw axis 30 and the roll axis 32 align respectively with the windmill axis 90 and the overturning axis 92 at midnight when the spacecraft 20 is in position 88B. The terms "overturning" and "windmill" refer to attitude changes of the spacecraft as described below in relation to FIG. 6B.

FIGS. 5A–5E illustrate typical radiation pressure forces induced by reflection, absorption and radiation in an exemplary panel 100 with a front face 101 and a back face 102 (with the exception of the arrows 100, all the arrows of FIGS. 5A–5E are vectors with magnitude and direction). In FIG. 5A, the upper face 101 is assumed to be specularly reflective. Photons 104 are incident upon the face 101 with an angle of incidence $\alpha$ to a normal 106 of the face 101. Because the face 101 is specularly reflective, reflected photons 107 leave the face 101 with an angle of reflection that equals the angle of incidence. In this type of face, a radiation pressure force 110 is induced in the panel 100 which is the vector sum of the incident photon vector 104 and a vector which is the inverse of the reflected photon vector 107. Accordingly, a radiation pressure force 110 is directed opposite to the normal 106.

In FIG. 5B, the face 101 is assumed to be completely absorptive. Incident photons 104 are absorbed in the face 101 and this induces a radiation pressure force 114 in the panel 100 which is equal and opposite to the incident photons 104. That is, the radiation pressure force 114 is directed away from the back face 102 and parallel to the incident photons 104.

In FIG. 5C, the upper face 101 is assumed to be diffusively (equally in all directions) reflective. In this case, incident photons 104 are reflected from the face 101 as indicated by vectors 116 within an imaginary circle 118. These vectors 116 sum to a vector 120 which is directed along the normal 106. The vectors 104 and 120 generate a radiation pressure force 122 that is the vector sum of the vector 104 and a vector which is the inverse of the vector 120. Therefore, the radiation pressure force 122 is directed away from the back face 102 and forms an angle with a normal 123 to the back face 102. This angle is a function of the direction of the incident photons 104.

In FIG. 5D, both faces 101 and 102 have the same thermal emissivity. In thermal emission, photons are emitted from the front face 101 as indicated by the vectors 124 within imaginary circles 125. This emission is described by Stefan's Law of $R=\epsilon\sigma T^4$, in which R is the energy radiated per unit area, $\epsilon$ is emissivity, $\sigma$ is Stefan's constant and T is temperature in degrees Kelvin. The effects of the photon vectors 124 from the front face 101 add to generate a radiation pressure force 126 which is directed from the back face 102 along a normal 123. Similarly, photons which are emitted from the back face 102 generate a radiation pressure force 128 which is directed from the front face 101 along the normal 106. In this structure, the magnitudes of the radiation pressure forces 126 and 128 are equal and opposite and, therefore, the net radiation pressure force is zero.

In FIG. 5E, the front face 101 has a thermal emissivity of zero and the back face 102 has the same thermal emissivity that it had in FIG. 4D. In this structure, a radiation pressure force 128 is directed from the front face 102 along the normal 106 and no radiation pressure force is generated from the back face 102.

In FIG. 6A, a simplified, conventional spacecraft 130 is illustrated. The spacecraft 130 has the wings 22 and 24 of FIG. 1 rotatably connected to a spacecraft center of gravity 131. Because the solar radiation 83 is the source of attitude-disturbance torques and attitude-control torques on the spacecraft 130, these torques are conveniently described with reference to the space frame coordinates of FIG. 4, i.e., the windmill axis 90 and overturning axis 92.

In FIG. 6A, the solar wings 22 and 24 have been rotated on the pitch gimbal of the spacecraft 130 so that they are substantially normal to the solar radiation 83 (the solar wings of spacecraft in geostationary orbits are tilted ~23° along the pitch axis 34 of FIG. 1 as the earth moves in its yearly cycles between solstice and equinox).

As the solar radiation 83 strikes various surfaces of a spacecraft, it generates attitude-disturbance torques which have components along the windmill axis 90 and the overturning axis 92. Over time these disturbance torques can significantly alter the spacecraft's attitude and must, therefore, be corrected by opposing control torques. Attitude-disturbance torques are also developed along an axis which is normal to the orbital plane (86 in FIG. 8). Because the solar wings and other spacecraft structure generally have comparatively small dimensions in the orbital plane, these torques are quite small and are easily accommodated with conventional techniques such as a pitch momentum wheel with occasional thruster dumping. Pitch momentum control is not the subject of this patent.

FIG. 6B is similar to FIG. 6A with like elements indicated by like reference numbers. This figure illustrates a conventional process for generating attitude-control torques. The wing 24 is rotated from a position 24A (its position in FIG. 6A) to a position 24B. Because the wing 24 now has less area normal to the solar radiation 83, the radiation pressure force on this wing is less than that on the wing 22. The tilt of the wing causes this force to have two components; one directed parallel with the solar radiation 83 and one directed normal to the solar radiation 83.

Because the component on the solar wing 24 which is parallel to the solar radiation 83 is less than the corresponding component on the wing 22, the wings will be urged to rotate about the overturning axis 92 as indicated by the curved movement arrow 132 (i.e., the torque acts to "overturn" the spacecraft 130). Thus, a positive overturning torque has been generated as indicated by the torque vector 134 along the overturning axis 92 (a torque urges rotation about an axis and is conventionally indicated by a vector along that axis; the magnitude of the vector indicates the torque magnitude and the vector direction is conventionally determined by the right-hand rule).

The force component on the wing 24 which is normal to the solar radiation 83 generates a positive windmill torque 136 which is shown along the windmill axis 90. This torque urges the spacecraft to rotate about the windmill axis 90 as indicated by the curved movement arrow 138 (i.e., the torque acts to "windmill" the spacecraft 130 about the axis 90).

The rotation of the wing 24 in FIG. 6B has generated two attitude-control torques. These attitude-control torques lie substantially in the orbital plane (86 of FIG. 4) and can be used to oppose attitude-disturbance torques on the spacecraft 130. However, the torques cannot be independently generated. Any tilt of the wings 22 and 24 (on the spacecraft's pitch gimbal) that causes them to be nonplanar will necessarily generate both overturning and windmill torques. With this wing structure, it is impossible to correct a single attitude-disturbance torque, e.g., a disturbance torque along the windmill axis 90.

FIG. 6C is similar to FIG. 6A with like elements indicated by like reference numbers. This figure illustrates a spacecraft 140 which is formed by the addition of conventional solar tabs 146 and 148 to opposite outboard corners 147 and 149 of the wings 22 and 24. The tabs 146 and 148 are angled away from the solar radiation 83. Their faces (corresponding to the faces 52 and 54 of FIG. 2) are typically configured with 1) reflectances that vary from specular to diffuse and/or with varying absorptivities and 2) with substantially equal thermal emissivities.

FIG. 6D is similar to FIG. 6C with like elements indicated by like reference numbers. This figure is a simplified version of the spacecraft 20 of FIG. 1. In contrast to the conventional spacecraft 140 of FIG. 6C, the spacecraft 20 has tabs 46 and 48 with the absorptivity, conductivity and emissivity characteristics which were described above relative to FIGS. 1-3.

FIG. 7A is a side view of the conventional tab 148 of FIG. 6C (equivalently, a side view of the tab 146). The tab has a front face 152 and a back face 154. A normal 156 to the front face and a normal 158 to the back face may be respectively termed a "front normal" and a "back normal". When the solar radiation 83 is incident upon the front face 152, it will generate a radiation pressure force vector whose direction will be directed somewhere in the region 162 (indicated with hatching lines) between the back normal 158 and an extension 83E of the solar radiation 83.

This follows because the conventional tab has a front face 156 that combines some proportion of absorption, specular reflection and diffusive reflection. In addition, the tab 148 does not generates a net radiation pressure force by thermal radiation. Therefore, the resultant radiation pressure force must be similar to some combination of the radiation pressure forces 110, 114 and 122 of FIGS. 5A, 5B and 5C. Obviously, any combination of these vectors must lie in the region 162 between the back normal 158 and the solar radiation extension 83E.

In contrast, FIG. 7B is an edge view of the tab 48 of FIG. 1 and 6D (equivalently, an edge view of the tab 46). As shown in FIG. 2, the tab 48 has a front face 52 and a back face 54. FIG. 7B also has the front normal 156 and back normal 158 of FIG. 7A. When the solar radiation 83 is incident upon the front face 156, it will generate a radiation pressure force vector whose direction will be directed somewhere in the region 168 (indicated with hatching lines) between the front normal 156 and an extension 83E of the solar radiation 83.

This follows because a tab in accordance with the present invention has an absorptive and nonemissive front face 52, a high thermal conductance between faces and an emissive back face 54. Therefore, the resultant radiation pressure force must be similar to some combination of the radiation pressure forces 114 and 128 of FIGS. 5B and 5E. Obviously, any combination of these vectors must lie in the region 168 between the front normal 156 and the extension 83E.

Thus, the tabs 46 and 48 generate radiation pressure forces whose direction is significantly different from the direction of radiation pressure forces generated by conventional tabs such as the tabs 146 and 148 of FIG. 7A. This difference enhances the generation of attitude-control torques in the spacecraft 20 of FIGS. 1 and 6D. This difference enables the solar tabs 46 and 48 to generate superior attitude-control torques as described below with relation to FIGS. 10A–10D.

FIG. 8 illustrates the nonplanar relationship of a solar tab with a solar wing in FIGS. 1 and 6D. For exemplary purposes, the figure shows the tab 46 and the wing 22. The wing 22 has a front face 170 and a back face 171 and a back normal 172, i.e., a normal with the back face 171. The tab 46 is oriented to have a tilt angle 175 between itself and the back normal 172. Equivalently, the tab 46 is oriented so that its back face 54 forms an angle 176 with the back face 171 of the wing 22.

FIGS. 9A–9D illustrate the radiation pressure forces generated by the effect of the solar radiation 83 on the solar wings 22 and 24 and conventional tabs 146 and 148 of the spacecraft 140 of FIG. 6C. In these figures it is assumed that the wings 22 and 24 pivot to limit positions of ±20° degrees and that the tabs are oriented at a tilt angle of 25° degrees (the tilt angle 172 of FIG. 8). The wings and tabs are presented as they would appear from the plane 9—9 in FIG. 6C. For clarity of illustration, the wing 24 and tab 148 and the wing 22 and tab 146 are spaced above and below the windmill axis 90 and the overturning axis 92.

The radiation pressure forces produce attitude-control torques which have been analyzed and plotted as curves 202, 204 and 206 in the graph 200 of FIG. 11 for various tab characteristics. In this graph, the curve 202 corresponds with tabs which are specularly reflective and have equal emissivities from front and back faces. The curve 204 corresponds with tabs which are diffusely reflective and have equal emissivities on front and back faces. Finally, the curve 206 corresponds with tabs which are fully absorptive and have equal emissivities from front and back faces. A closed curve 208 indicates an exemplary range of attitude-disturbance torques which are principally generated by radiation pressure forces on various exposed surfaces of the spacecraft 140. For exemplary purposes, it is assumed that the tabs 146 and 148 of FIGS. 9A–9D correspond to the curve 204 of FIG. 11.

In FIG. 9A, the solar radiation 83 generates a radiation pressure force 210 on the wing 22 and a smaller radiation pressure force 212 on the tab 146 (smaller because of the lesser area and greater incidence angle of the tab). These forces are directed between an extension of the solar radiation 83 and a back normal, i.e., into a region similar to the region 162 of FIG. 7A. Similar radiation pressure forces 211 and 213 are generated on the wing 24 and tab 148.

Each of these radiation pressure forces is broken into component vectors that are parallel and normal to the solar radiation 83. In FIG. 9A, the component vectors which are parallel to the solar radiation 83 are equal on both wings and equal on both tabs, but are in the same direction so that no overturning torque is produced. The component vectors which are normal to the solar radiation 83 are also equal on the wings and equal on the tabs but they are opposite in direction, which produces a large positive windmill torque 216 along the windmill axis 90. Locations on the curves 202, 204 and 206 of FIG. 11 which correspond to the wing and tab positions of FIG. 9A are indicated by letters A.

In FIG. 9B, the wing 24 has been rotated to its opposite limit and radiation pressure forces 217 and 219 are generated upon the wing 24 and tab 148. The radiation pressure force 219 on the tab 148 is now larger than the radiation pressure force 212 on the tab 146 because the tab 148 is more nearly normal to the solar radiation 83. The vector components which are parallel to the solar wing are no longer equal because of the larger pressure force 219, and a negative overturning torque 222 is produced along the overturning axis 92. The vector components on the wings 22 and 24 which are normal to the solar radiation 83 are equal and in the same direction so that they cancel. The normal components on the tabs 146 and 148 are unequal and opposite, which produces a small negative windmill torque 224 along the windmill axis 90. Locations on the curves 202, 204 and 206 of FIG. 11 which correspond to the wing and tab positions of FIG. 9B are indicated by letters B.

In FIG. 9C, the wing 22 has been rotated to its opposite limit (from that of FIG. 9B) and radiation pressure forces 226 and 228 are generated upon the wing 22 and tab 146. These radiation pressure forces equal their respective forces 217 and 219 on the wing 24 and tab 148. The vector components which are parallel to the solar radiation are equal on both the wings and the tabs but are in the same direction so that no overturning torque is produce. The normal components of each wing are slightly greater than the normal component of its respective tab so that a negative windmill torque 230 is produced along the windmill axis 90. Locations on the curves 202, 204 and 206 of FIG. 11 which correspond to the wing and tab positions of FIG. 9C are indicated by letters C.

In FIG. 9D, the wing 24 has been rotated to its opposite limit from that of FIG. 9C. The wing and tab positions are reversed from those of FIG. 9B. Therefore, an overturning torque 232 and a windmill torque 234 are produced which are of the same magnitude but of opposite directions from those of FIG. 9C. Locations on the curves 202, 204 and 206 of FIG. 11 which correspond to the wing and tab positions of FIG. 9D are indicated by letters D.

The curves 202, 204 and 206 of FIG. 11 represent the attitude-control torques which the spacecraft 140 of FIG. 6C can realize as its wings are rotated between the limits of FIGS. 9A–9D. In particular, the curves represent the radiation control torques which are realizable with tabs that have equal thermal emissivities on front and back faces. The curves demonstrate that such tabs cannot generate sufficient radiation control torques in the left two quadrants of FIG. 11 to oppose the attitude-disturbance torques which are represented by the closed curve 208.

Accordingly, the area of the tabs 146 and 148 must be increased to achieve the necessary radiation control torques. Although this change in structure would be sufficient to oppose the attitude-disturbance torques, it comes at the cost of added size and weight; costs which are preferably avoided in spacecraft design.

Attention is now directed to the operation of the spacecraft 20 of FIGS. 1 and 6D as illustrated in FIGS. 10A–10D. The wings and tabs are presented as they would appear from the plane 10—10 in FIG. 6D. These figures are similar to FIGS. 9A–9D, with like elements represented by like reference numbers. However, the tabs 46 and 48 replace the tabs 146 and 148. Because of this, the radiation pressure forces 212 and 213 of FIGS. 9A are replaced respectively with radiation pressure forces 240 and 241. In contrast with the pressure forces 212 and 213, the forces 240 and 241 are directed between an extension of the solar radiation 83 and a front normal, i.e., into a region similar to the region 168 of FIG. 7B. In a similar manner, the forces 219 and 228 of FIGS. 9A–9D are replaced with forces 243 and 244, which are also directed into a region similar to the region 168 of FIG. 7B.

FIG. 10A shows that a positive windmill torque 246 is generated which is not significantly different from the windmill torque 216 of FIG. 9A because the force components normal to the solar radiation 83 are so small in the tabs of either figures that they are dominated by the normal components of the wings 22 and 24.

However, in FIG. 10C the tabs 46 and 48 now contribute vector components normal to the solar radiation 83 that add to those of the wings 22 and 24 rather than subtract from them as in FIG. 9C. Thus, a significantly greater negative windmill torque 248 is produced in this figure.

In FIG. 10B, the radiation pressure force 243 also produces a normal component which adds to that of the force 217 in contrast to FIG. 9B, in which the normal components of forces 217 and 219 were in opposition. Consequently, a larger windmill torque 250 is generated in FIG. 10B. Because the orientation of wings and tabs in FIG. 10D is the opposite of that in FIG. 10B, a windmill torque 252 of equal magnitude but opposite direction is generated. Force components parallel to the solar radiation 83 are not significantly changed in FIGS. 10A-10D so that the overturning torques 252 of FIGS. 10B and 10C are comparable to those of FIGS. 9B and 9C.

The attitude-control torques produced by the wings 22 and 24 and tabs 46 and 48 of FIGS. 10A-10D have been calculated and plotted as the curve 260 in the graph 200 of FIG. 11. Locations on the curve 260 which correspond with the wing and tab positions of FIGS. 10A-D are indicated by letters A-D. It is important to note that because of the increased negative windmill torques of FIGS. 10B-D, the curve 260 exhibits significantly increased attitude-control torques in the left two quadrants of the graph and envelops the attitude-disturbance curve 208. The tabs 46 and 48 have increased the attitude-control torques so that they can oppose the attitude-disturbance torques of the closed curve 208 without requiring an increase in the size and weight of the tabs.

The tabs 46 and 48 have an absorptive and substantially nonemissive front face, a nonzero thermal conductivity between faces and an emissive back face. With this structure, the following operation occurs: a) incident photons are absorbed in the front face, b) the resultant heat is conducted to the back surface and c) photons are emitted from the back surface.

This controlled emission generates a radiation pressure force from the back faces of the tabs 46 and 48. As shown in FIG. 10C, this produces (from the forces 243 and 244) components normal to the solar radiation 83 which add to similar components of the wings 22 and 24. Similar additive normal components are formed in FIGS. 10B and 10D. As a consequence, windmill torques of the curve 260 are significantly increased in the left two quadrants of FIG. 11. This means that the attitude-control torques of the spacecraft 20 of FIGS. 1 and 6D are sufficient to counter the attitude-disturbance torques represented by the curve 208. In a study of a proposed prototype spacecraft, this controlled emission was found to increase a least-magnitude, attitude-control torque from 40µ N-m to 70µ N-m.

The tabs are preferably positioned near or at the outboard ends 47 and 49 of the solar wings as shown in FIG. 1 to increase their induced torque on the spacecraft 20. To enhance their generation of attitude-control torques, the tabs 46 and 48 are oppositely spaced from the rotation axis of the wings 22 and 24, e.g., the pitch axis 34 in FIG. 1. Thus, the tabs 46 and 48 could also be positioned as indicated by the tabs 46A and 48A in FIG. 1. Alternatively, other embodiments of the invention can include more than two tabs, e.g., tabs 46, 46A, 48 and 48A in FIG. 1.

The tabs 46 and 48 are positioned in a nonplanar arrangement with their respective wing. In particular, they form an angle (176 in FIG. 8) between their back face and the back face of their respective wing so that they are always exposed to the solar radiation as the wings are rotated between opposite limits. Typically, the rotation limits of the wings 22 and 24 is between ±5 degrees and ±40 degrees. Thus, the angle 176 is preferably in the range between 100 degrees and 135 degrees. Because the back face of either of the tabs 46 and 48 is typically not exposed to the solar radiation, its absorptivity is not of importance. This is indicated by the preferred portions 72 and 73 in FIG. 3 for the characteristics of the back face.

A tab such as the tab 46 in FIG. 1 can also be positioned anywhere on a spacecraft to generate a radiation pressure force. The tab need only be positioned to receive the solar radiation 83 on its front face 52. The tab can be arranged to orient its radiation pressure force, e.g., the force 244 in FIG. 10C, in a desired direction.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. Apparatus for using solar radiation to generate at least one attitude-control torque on a spacecraft which has a body and first and second wings extending oppositely from said body, said wings rotatable about a rotation axis and each having front and back faces, comprising:

first and second tabs attached respectively to said first and second wings and oppositely spaced from said rotation axis;

a front face formed by each of said tabs with a solar radiant-energy absorptivity greater than 0.5 and a thermal emissivity less than 0.5; and a back face formed by each of said tabs with a thermal emissivity greater than 0.5;

photon absorption from said solar radiation in the front faces of said first and second tabs and thermal emission of photons from the back faces of said first and second tabs generating said attitude-control torque.

2. The apparatus of claim 1, wherein the front face of each of said first and second tabs has a radiant-energy absorptivity greater than 0.75 and a thermal emissivity less than 0.25.

3. The apparatus of claim 1, wherein the back face of each of said first and second tabs has an thermal emissivity greater than 0.75.

4. The apparatus of claim 1, further including a black nickel coating on the front face of each of said first and second tabs.

5. The apparatus of claim 1, further including a black chromium coating on the front face of each of said first and second tabs.

6. The apparatus of claim 1, further including a black coating on the back face of each of said first and second tabs.

7. The apparatus of claim 1, further including a white coating on the back face of each of said first and second tabs.

8. The apparatus of claim 1, wherein said first and second tabs are arranged in a nonplanar relationship with their respective wings.

9. The apparatus of claim 1, wherein the back face of each of said first and second tabs forms an angle between 100 and 135 degrees with the back face of that tab's respective wing.

10. The apparatus of claim 1, wherein each of said first and second tabs comprises a polyester film having a thickness less than 70 microns to enhance thermal conductivity between its front and back faces.

11. Apparatus for using solar radiation to generate at least one radiation pressure force on a spacecraft, comprising:

a tab;

a front face formed by said tab with a solar radiant-energy absorptivity greater than 0.5 and a thermal emissivity less than 0.5; and a back face formed by said tab with a thermal emissivity greater than 0.5;

wherein said tab is attached to said spacecraft and positioned to receive said solar radiation with said front face;

photon absorption from said solar radiation in said front face and thermal emission of photons from said back face generating said radiation pressure force.

12. The apparatus of claim 11, wherein said tab front face has a radiant-energy absorptivity greater than 0.75 and a thermal emissivity less than 0.25.

13. The apparatus of claim 11, wherein said tab back face has an thermal emissivity greater than 0.75.

14. The apparatus of claim 11, further including a black nickel coating on the front face of each of said first and second tabs.

15. The apparatus of claim 11, further including a black chromium coating on the front face of each of said first and second tabs.

16. The apparatus of claim 11, further including a black coating on the back face of each of said first and second tabs.

17. The apparatus of claim 11, further including a white coating on the back face of each of said first and second tabs.

18. The apparatus of claim 11, wherein each of said first and second tabs comprises a polyester film having a thickness less than 70 microns to enhance thermal conductivity between its front and back faces.

19. A spacecraft configured to use solar radiation to generate at least one attitude-control torque in said spacecraft, comprising:

a body;

first and second wings extending oppositely from said body, said wings rotatable about a rotation axis and each having front and back faces;

at least first and second tabs attached respectively to said first and second wings and oppositely spaced from said rotation axis;

a front face formed by each of said tabs with a solar radiant-energy absorptivity greater than 0.5 and a thermal emissivity less than 0.5; and a back face formed by each of said tabs with a thermal emissivity greater than 0.5;

photon absorption from said solar radiation in the front faces of said first and second tabs and thermal emission of photons from the back faces of said first and second tabs generating said attitude-control torque.

20. The spacecraft of claim 19, wherein the front face of each of said tabs has a radiant-energy absorptivity greater than 0.75 and a thermal emissivity less than 0.25.

21. The spacecraft of claim 19, wherein the back face of each of said tabs has an thermal emissivity greater than 0.75.

22. The spacecraft of claim 19, further including a black nickel coating on the front face of each of said tabs.

23. The spacecraft of claim 19, further including a black chromium coating on the front face of each of said tabs.

24. The spacecraft of claim 19, further including a black coating on the back face of each of said tabs.

25. The spacecraft of claim 19, further including a white coating on the back face of each of said tabs.

26. The spacecraft of claim 19, wherein said tabs are arranged in a nonplanar relationship with their respective wings.

27. The spacecraft of claim 19, wherein the back face of each of said tabs forms an angle between 100 and 135 degrees with the back face of that tab's respective wing.

28. The apparatus of claim 19, wherein each of said first and second tabs comprises a polyester film having a thickness less than 70 microns to enhance thermal conductivity between its front and back faces.

* * * * *